United States Patent [19]

Nordling

[11] 3,922,606

[45] Nov. 25, 1975

[54] ADAPTIVE DELTA MODULATION INFORMATION TRANSMISSION SYSTEM

[75] Inventor: K. Fredrik Nordling, Mill Valley, Calif.

[73] Assignee: Dicom Systems Ltd., British Columbia, Canada

[22] Filed: Apr. 8, 1974

[21] Appl. No.: 458,806

[52] U.S. Cl. .................... 325/38 B

[51] Int. Cl.[2] .................... H04L 23/00

[58] Field of Search .................. 325/38 B, 38 R, 62; 332/11 D; 179/15 AP

[56] References Cited

UNITED STATES PATENTS 3,393,364 7/1968 Fine .................. 325/38 B 3,784,922 1/1974 Blahut .................. 325/38 B

*Primary Examiner*—George H. Libman

*Attorney, Agent, or Firm*—Limbach, Limbach & Sutton

[57] ABSTRACT

An adaptive type of companded delta modulation system is disclosed in which the quantization step size is varied in response to predetermined patterns of the present, last previous and second last previous delta bits. The average step size magnitude change is optimized by inhibiting successive step size changes in sequential data intervals.

8 Claims, 5 Drawing Figures

ADAPTIVE DELTA MODULATION INFORMATION TRANSMISSION SYSTEM

BACKGROUND OF THE INVENTION

The present invention relates to a delta modulation information transmission system and more particularly to a type of companded delta modulation information system wherein the quantization step size of an analog signal represented by a series of digital bits or "delta bits" is variable over a wide dynamic range in response to predetermined patterns in the series.

Delta modulation systems of the general type as that of the present invention are well known in the art and are described variously as "companded" and "adaptive". An excellent survey of delta modulation in general which includes a description of certain prior art companded delta modulation systems, showing the theoretical advantage of such systems, is "Delta Modulation" by H. R. Schindler in the IEEE Spectrum, October, 1970, pp. 69–78.

One particular type of companded delta modulation is known as "adaptive" delta modulation. In such systems the quantization step size is varied in accordance with a set of predetermined rules or logic algorithm. Prior art systems of this type are described in the aforementioned Schindler article; in "Adaptive delta modulation with a one-bit memory" by N. S. Jayant, *Bell System Technical Journal*, Vol. 49, March, 1970, pp. 321–342; in "Characteristics of a Delta Modulator" by N. S. Jayant, *Proceedings of the IEEE*, March, 1971, pp. 428,429; and in U.S. Pat. No. 3,621,396 to T. H. Daugherty. The advantages of companded predictive delta modulators of the adaptive type are well set forth in the aforementioned and other prior art literature and will not be repeated here.

The prior art has continually sought the "ideal" approach for controlling the quantization step size in adaptive delta modulation systems while at the same time seeking simplicity and low cost. For example, a wide dynamic range of step size is desirable which implies greater complexity, a larger number of components and higher manufacturing cost.

SUMMARY OF THE INVENTION

In accordance with the teachings of the present invention an improved adaptive delta modulation system is provided in which changes in the quantization step size are based upon the present and two immediate past delta bits. The use of a three bit store overcomes simply the tendency of prior art systems to generate noise bursts due to step size phenomena and allows a wide dynamic step size range while minimizing the switch resistor network complexity. Furthermore, the present system provides an average quantization step size change of $\sqrt{2}$ which is close to the value of 1.2–1.5 considered to be optimum.

According to the algorithm of the present system, the step size is increased when the present, first past and second past delta bits are the same digital signal (i.e., all "0" or "1", in the usual notation). The step size is decreased when the present and second past delta bits are the same digital signal and not the same as the first past delta bit. In the remaining cases, the step size is not changed.

In the preferred embodiment of the invention a number of step sizes are available which are related to each other by a factor of two. In order to provide an average step size change of $\sqrt{2}$, the step size is not permitted to increase or decrease in two successive data intervals.

The present invention permits tailoring of integrating network drivers to permit easy fabrication by conventional metal-oxide-semiconductor technology.

These and other advantages of the present invention will become apparent as the specification is read and understood.

DESCRIPTION OF THE PREFERRED EMBODIMENTS

Figure 1:
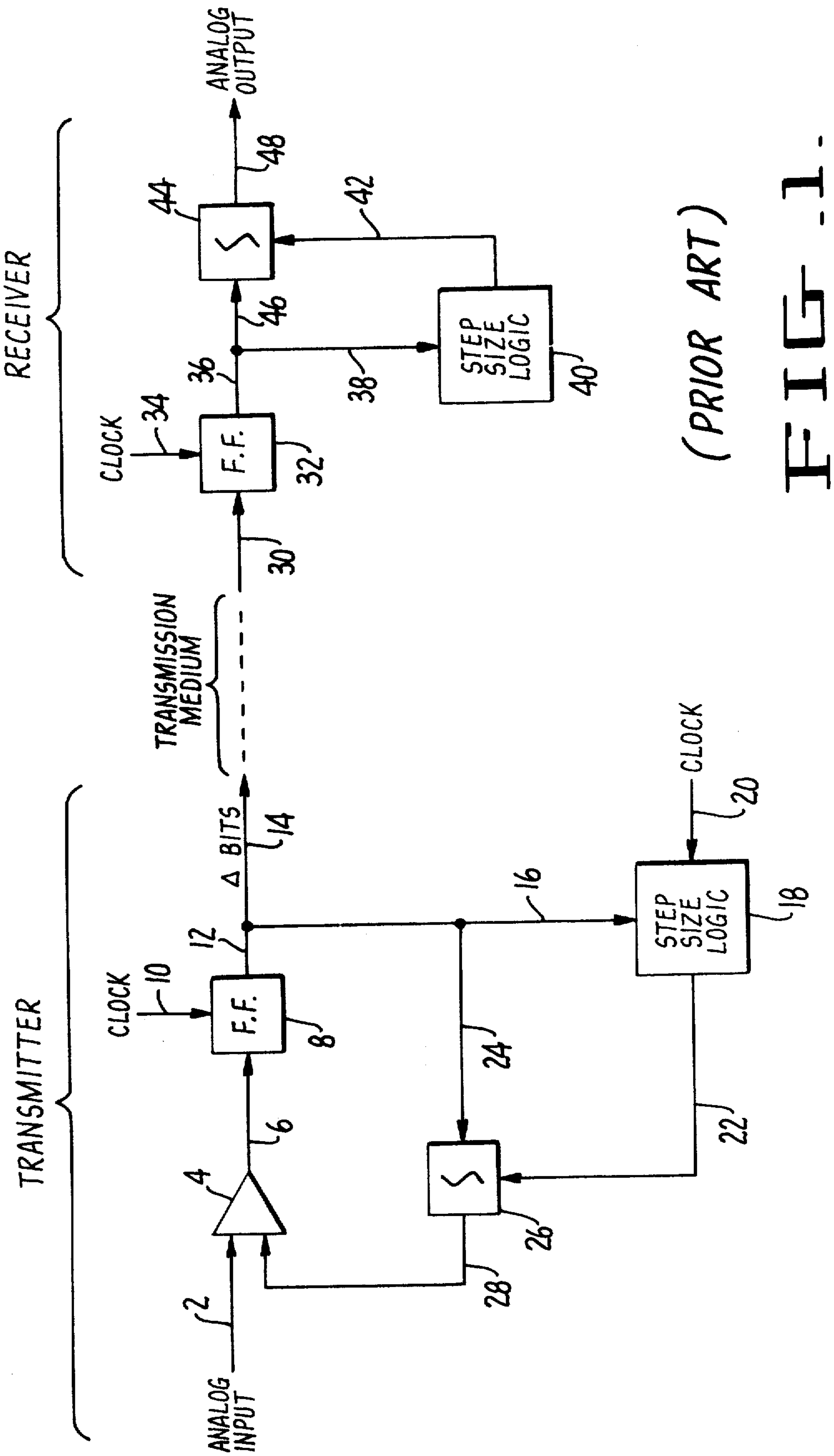
(PRIOR ART) FIG. 1.
FIG. 1 is a block diagram of the general form of an adaptive delta modulation system as is well known in the prior art.

Referring now to FIG. 1 of the drawings wherein an adaptive delta modulation information transmission system is shown generally as comprising a transmitter portion and a receiver portion connected by a transmission medium. An analog input signal, which ordinarily will be a voice audio signal is applied to the transmitter on an input line 2. The transmitter portion includes a comparator 4, a flip-flop 8, an integrator 26 and a step-size logic circuit 18. The output of the transmitter portion comprising first and second digital signals, such as "ones" and "zeroes" representing the companded delta modulation information or "delta bits" are provided on output line 14 to the transmission medium which may take any suitable form. The digital delta bit information from the transmission medium is applied to the receiver portion on an input line 30. The receiver portion includes a flip-flop 32, a step-size logic circuit 40, as in the transmitter portion, and an integrator 44, as in the transmitter portion. An analog output signal is provided on line 48 which closely follows the analog input signal on line 2 of the transmitter portion. The delta modulation system elements shown in FIG. 1 are configured in a manner well known in the prior art.

Referring more specifically to the arrangement of the adaptive delta modulation system of FIG. 1, the comparator 4 receives the analog input signal on line 2 and the output of the integrator 26 on line 28 and provides either a signal of a first sense if the magnitude of the line 2 signal exceeds that of the line 28 signal or a signal of a second sense if the line 28 signal magnitude exceeds the line 2 signal magnitude. The output of comparator 4 on line 6 is sampled by means of a flip-flop 8 which receives the sampling clock signal on line 10. The output of flip-flop 8 on line 12 is the transmitter portion output and comprises a serial bit stream of first and second digital signals comprising digital bits spaced in time by the periodic clock signal on line 10. The serial bit stream thus has a data interval defined by the periodic clock signal and in accordance with conventional delta modulation transmitter operation the data stream represents an increase or decrease of the analog signal by predetermined amount.

The flip-flop output on line 12 is also applied to a conventional integrator 26 via line 24 and to a step size logic circuit 18 via line 16. The step size logic circuit 18 also receives the same periodic clock signal on line 20 as is present on line 10. The circuit 18 output on line 22 controls the quantization step size effected by the integrating circuit 26.

In the receiver portion of the system, flip-flop 32 receives the delta bits on input line 30 and is clocked by a periodic clock signal on line 34 which is derived from the signal on line 30 by means not shown. The flip-flop 32 output is applied on lines 36 and 46 to integrator 44 and on lines 36 and 38 to step size logic circuit 40. Circuit 40 controls the quantization step size in integrator 44 via line 42.

Figure 2:
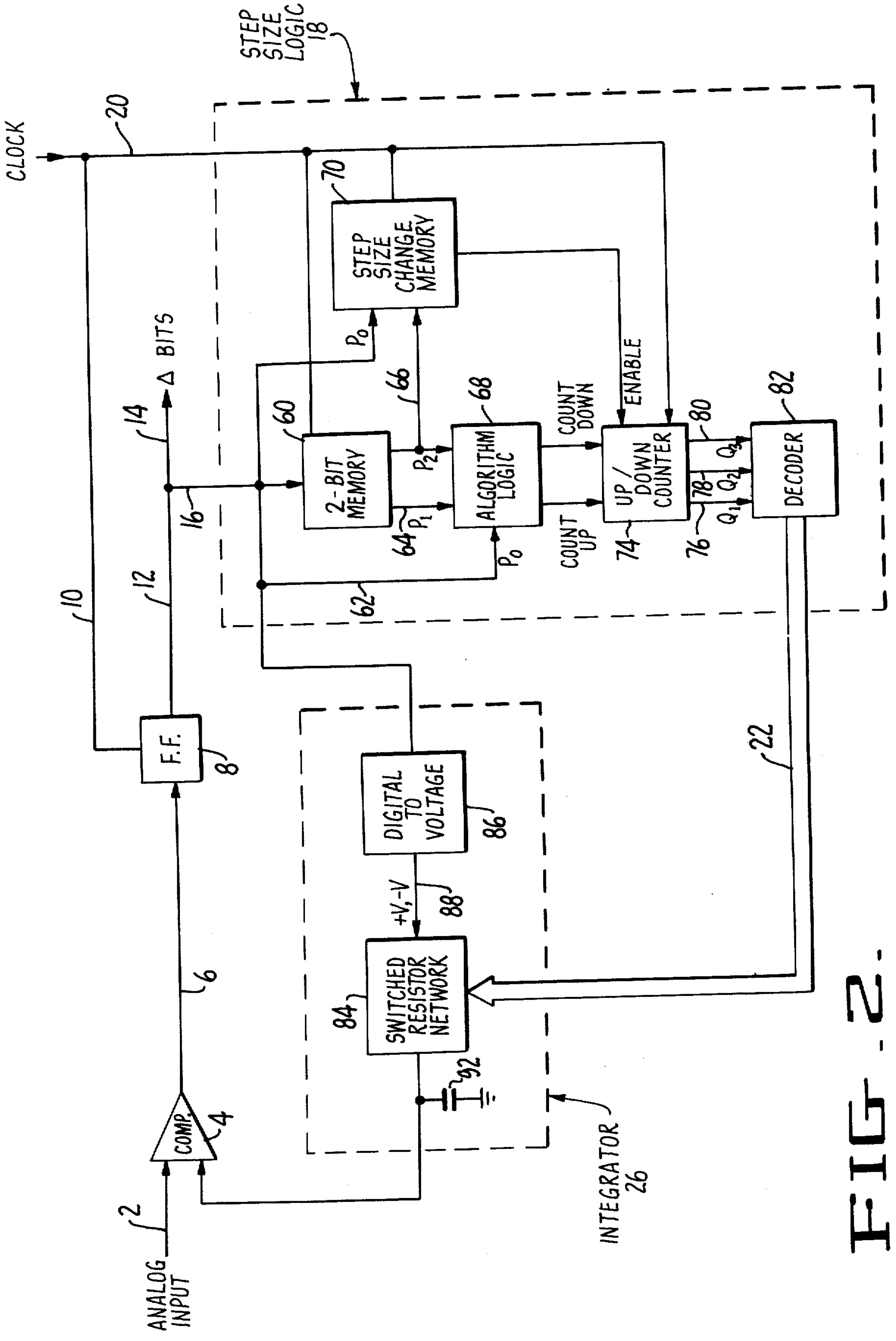
FIG. 2 is a block diagram of the transmitter portion of the adaptive delta modulation system according to the present invention.

Referring now to the remaining figures in which details of the adaptive delta modulation system according to the present invention are shown. In FIG. 2, the step size logic circuit 18 is shown as including a 2-bit memory 60, a step size change memory 70, an algorithm logic circuit 68, an up/down counter 74 and a decoder 82. The serial bit stream of delta bits on line 12 from the flip-flop 8 is applied to the 2-bit memory 60 which provides the same serial bit stream output on line 62, a serial bit stream delayed one data interval on line 64 and a serial bit stream delayed two data intervals on line 66. Flip-flop 8 in combination with 2-bit memory 60 constitutes a 3-bit memory. At any particular data interval the digital signals on lines 62, 64 and 66 may be referred to as $P_0$, $P_1$, and $P_2$, where $P_0$ is the present delta bit, $P_1$ is the last previous delta bit and $P_2$ is the second previous delta bit. Algorithm logic unit 68 receives lines 62, 64 and 66 and provides count up and count down signals to the up/down counter 74 in accordance with a predetermined algorithm. An up count signal is provided when $P_0$, $P_1$ and $P_2$ are equal to each other, that is, they are all "1's" or all "0's", and a down count signal is provided when the $P_0$ and $P_2$ signals are equal to each other and not equal to $P_1$.

The $P_0$ and $P_2$ signals on lines 62 and 66 are also applied to the step size change memory 70 which functions to prevent the up/down counter 74 from acting on successive count up or count down instructions from logic 68 in successive data intervals. The count in the up/down counter 74 comprises a step size number on lines 76, 78 and 80 which is referred to as $Q_1$, $Q_2$ and $Q_3$. The step size number, of which there are eight possible in this example, refers to a particular step size magnitude which is determined by decoder 82 which controls the integrator 26 via line 22. The clock signal 20 is applied to memory 60, memory 70 and counter 74.

The integrator 26 is shown as comprising a switched resistor network 84, a digital to voltage converter 86, which controls step polarity, and a capacitor 92. The resistance of network 84 is controlled by line 22 which thereby provides different RC values for changing the step size magnitude. The digital signal on line 24 is converted to a plus or minus voltage in converter 86 for application to network 84 on line 88.

Figure 3:
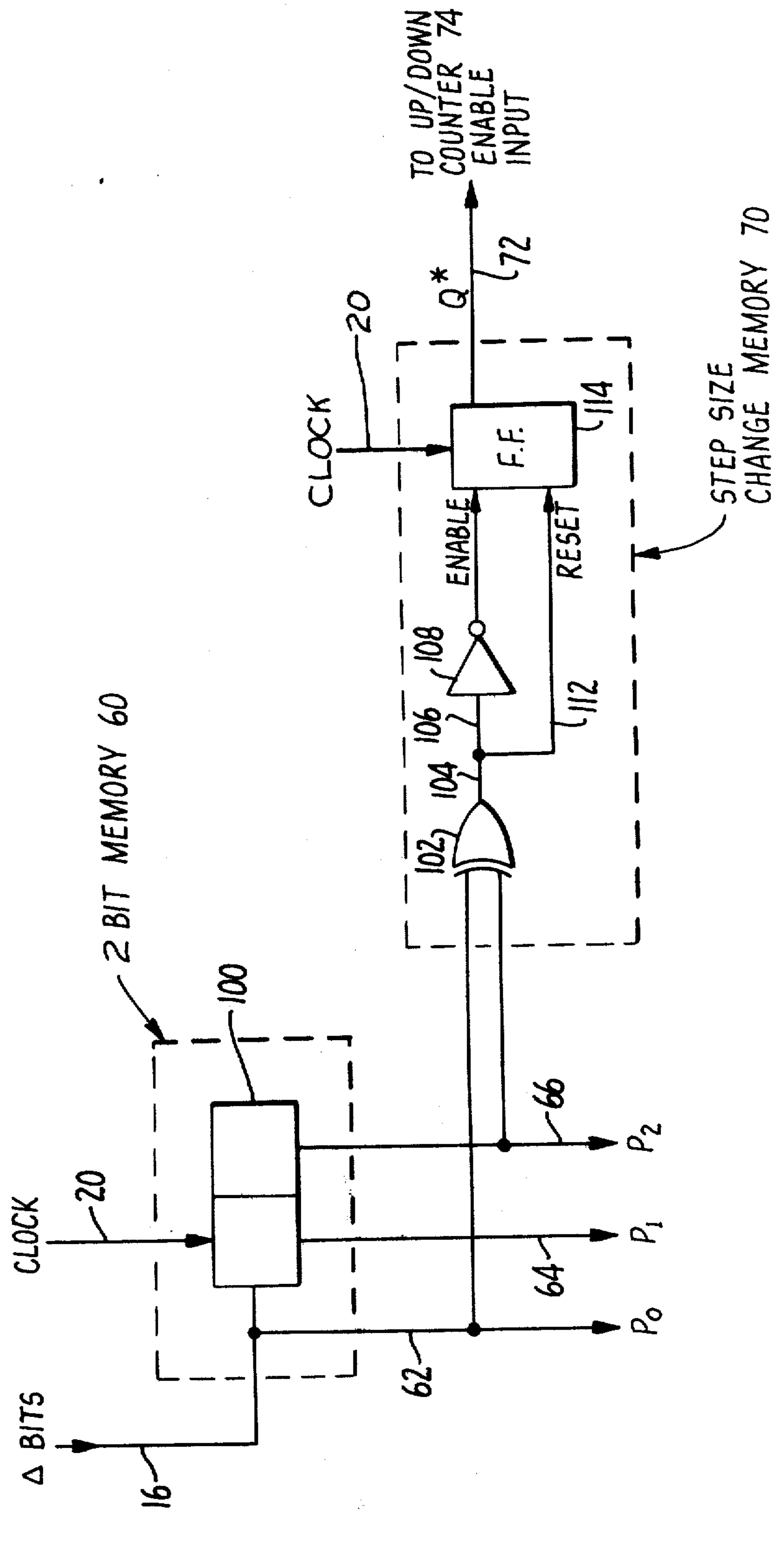
FIG. 3 is a partial block logic diagram of the three bit memory and step size change memory.

FIG. 3 shows the 2-bit memory 60 and step size change memory 70 in greater detail. Two-bit memory 60 preferably comprises a two-stage shift register 100 receiving the delta bits input on line 16 and the sampling clock on line 20. Thus producing the $P_0$, $P_1$ and $P_2$ outputs on lines 62, 64 and 66.

Step size change memory 70 comprises an exclusive-OR gate 102, an inverter 108 and a clock-triggered flip-flop 114. Flip-flop 114 changes state upon receipt of each clock pulse if the enable is "1" unless it has been reset. The output of gate 102 on line 104 is applied via line 106 to inverter 108 which provides the enable line to flip-flop 114 on line 110. Line 104 for gate 102 is also applied to 112 which is connected to the reset input of the flip-flop 114. The operation of memory 70 is best explained by the following truth table:

| $P_0$ | $P_2$ | Enable | Reset | $Q^*_{t+1}$ |
|---|---|---|---|---|
| 0 | 0 | 1 | 0 | $\overline{Q_t}^*$ |
| 0 | 1 | 0 | 1 | 0 |
| 1 | 1 | 1 | 0 | $\overline{Q_t}^*$ |
| 1 | 0 | 0 | 1 | 0 |

where $Q_t^* = Q^*$ at some reference time and $Q_{t+1}^* = Q^*$ one clock time later. The output of memory 70, which is referred to as $Q^*$, provides the enable output on line 72 to the up/down counter 74.

In operation, when $P_0 = P_2$ (indicating a needed change in step size) the flip-flop 114 is set and $Q^*$ is 1 thus enabling the up/down counter 74. If in the next following data interval $P_0 = P_2$ again, the clock causes the flip-flop 114 to change state to "0" thus disabling the up/down counter 74. So long as $P_0 = P_2$ the flip-flop 114 will alternate states so that the up-down counter 74 will change the step size number only every other data interval. Since a $P_0 \neq P_2$ condition resets the flip-flop 114, $Q^*$ can always be set "1" one data interval after a $P_0 = P_2$ condition follows a $P_0 \neq P_2$ condition.

Figure 4:
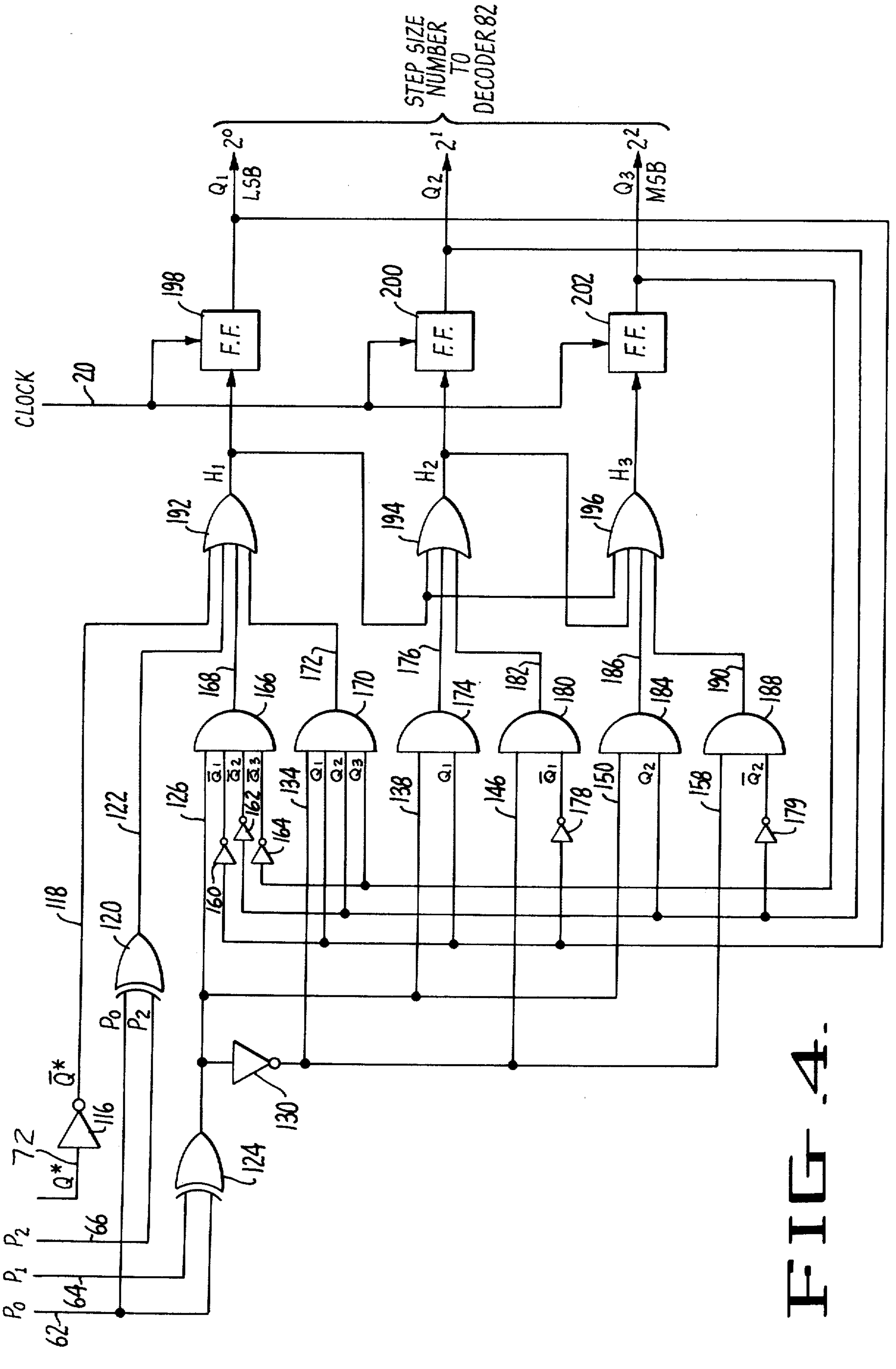
FIG. 4 is a partial block logic diagram of the algorithm logic and up/down counter.

FIG. 4 shows the logic circuit 68 and up/down counter 72 in greater detail. The $Q^*$ input on line 74 is applied to an inverter 116 to provide $\overline{Q^*}$ on line 118 to an input of OR gate 192. $P_0$ and $P_2$ are applied to an exculsive-OR gate 120 which is also connected to an input of OR gate 192 via a line 122. $P_0$ and $P_1$ are connected to an exculsive-OR gate 124 which is connected via line 126 to an AND gate 166. The output of exclusive-OR gate 124 is also applied to AND-gates 174 and 184 on lines 134 and 150, respectively. The gate 124 output is also applied to an inverter 130, the output of which is applied to AND gates 170, 180 and 188 on lines 134, 146 and 158, respectively. The output of AND gates 166 and 170 are connected to OR gate 192 via lines 168 and 172, respectively. The output of OR gate 192 provides an $H_1$ output to flip-flop 198 and to one of the inputs of OR gate 194. The output of AND gates 174 and 180 are connected to the remaining inputs of OR gate 194 via lines 176 and 182, respectively. The output $H_2$ of gate 194 is connected to a flip-flop 200 and to one of the inputs of OR gate 196. Gate 196 also receives the $H_1$ output of gate 192 and the outputs of AND gates 184 and 188 via lines 186 and 190, respectively. The OR gate 196 output on line $H_3$ is provided to flip-flop 202. A delayed sampling clock is produced by delay 197. This delay is a small fraction of the data interval and allows time for the signals to propagate through the algorithm logic to flip-flops 198, 200 and 202 before clocking them. This is an essential feature of the algorithm, that the step size outputs $Q_1$, $Q_2$ and $Q_3$ must respond to the newest delta bit $P_0$ in the same clock cycle. Flip-flops 198, 200 and 202 receive the delayed sampling clock on line 21 and flip-flops 198, 200 and 202 provide the outputs $Q_1$, $Q_2$ and $Q_3$ which comprise the step size number to decoder 82. $Q_1$ is the least significant bit and $Q_3$ is the most significant bit. $Q_1$, $Q_2$ and $Q_3$ are also fed back to earlier portions of the logic array. AND gate 166 receives $\overline{Q_1}$, $\overline{Q_2}$ and $\overline{Q_3}$ inputs from inverters 160, 162 and 164 which receive $Q_1$, $Q_2$ and $Q_3$, respectively. $Q_1$, $Q_2$ and $Q_3$ are directly applied to the inputs of AND gate 170. $Q_1$ is applied to the input of AND gate 174. $Q_1$ is also applied to an inverter 178 to provide a $\overline{Q}_1$ input to AND gate 180. $Q_2$ is applied to an input of AND gate 184 and also to an inverter 179 to provide a $\overline{Q}_2$ input to AND gate 188. The operation of the logic circuit 68 and up/down counter 74 is best understood with reference to the following equations where $Q_1$, $Q_2$ and $Q_3$ are binary $2^0$, $2^1$ and $2^2$ for the step size number, $Q^*$ is the step size change memory, $P_0$, $P_1$ and $P_2$ are the stored delta bit values and $H_1$, $H_2$ and $H_3$ are the hold inputs to the $Q_1$, $Q_2$ and $Q_3$ storage flip-flops which change state with each clock pulse unless the hold input is one.

$$H_1 = \overline{Q}^* + (P_0\overline{P}_2+P_2P_2\overline{P}_0) + \overline{Q}_1\overline{Q}_2\overline{Q}_3(P_1\overline{P}_0+ P_0\overline{P}_1) + Q_1Q_2Q_3(P_0P_1+ \overline{P}_0\overline{P}_1)$$

$$H_2 = H_1 + Q_1 (P_0\overline{P}_1+\overline{P}_0P_1)+ \overline{Q}_1(P_0P_1+\overline{P}_0 \overline{P}_1)$$

$$H_3 = H_1 +H_2 + Q_2(P_0\overline{P}_1+\overline{P}_0P_1) + \overline{Q}_2(P_0P_1+\overline{P}_0\overline{P}_1)$$

Reference to the equations for $H_1$, $H_2$ and $H_3$ reveals the following points. If $Q^*$ is "0" indicating either that $P_0 \neq P_2$ in the present or previous data interval or that $P_0$ has been equal to $P_2$ for at least three data intervals, then $\overline{Q}^*$ is "1" and $H_1$ is "1" (holding $Q_1$) and $H_2$ and $H_3$ are consequently "1" (holding $Q_2$ and $Q_3$). Thus $Q^*$ enables the counter 74. It will be noted that if any term in $H_1$ is "1" that $H_1$, $H_2$ and $H_3$ will all be "1" and will hold $Q_1$, $Q_2$ and $Q_3$. Also, if any term in $H_2$ is "1", $H_2$ and $H_3$ will be "1".

The second term in $H_1$ $(P_0\overline{P}_2 + P_2\overline{P}_0)$ is "1" only if $P_0 \neq P_2$, thus preventing a step size change by holding $Q_1$, $Q_2$ and $Q_3$.

The third term in $H_1$ $[\overline{Q}_1\overline{Q}_2\overline{Q}_3(P_1\overline{P}_0+P_0\overline{P}_1)]$is "1" if the lower step size limit has been reached (000) and a further decrease is indicated by $P_0 \neq P_1$.

The fourth term in $H_1$ is "1" if the upper step size limit (111) is reached and a further increase is indicated by $P_0 = P_1$.

The second term in $H_2$ $[Q_1(P_0\overline{P}_1+\overline{P}_0P_1)]$ is "1" on a decrease $(P_0 \neq P_1)$ if $Q_1$ is "1", otherwise $Q_2$ can change (i.e., count down).

The third term in $H_2$ is "1" on an increase $(P_0 = P_1)$ if $Q_1$ is "0", otherwise $Q_2$ can change (i.e., count up).

The third term in $H_3$ $[Q_2(P_0\overline{P}_1+\overline{P}_0P_1)]$ is "1" on a decrease $(P_0 \neq P_1)$ if $Q_2$ is "1", otherwise $Q_3$ can change (i.e., cound down).

The fourth term in $H_3$ $[\overline{Q}_2(P_0P_1+\overline{P}_0\overline{P}_1)]$ is "1" on an increase $(P_0 = P_1)$ if $Q_2$ is "0", otherwise $Q_3$ can change (i.e., count up).

Figure 5:
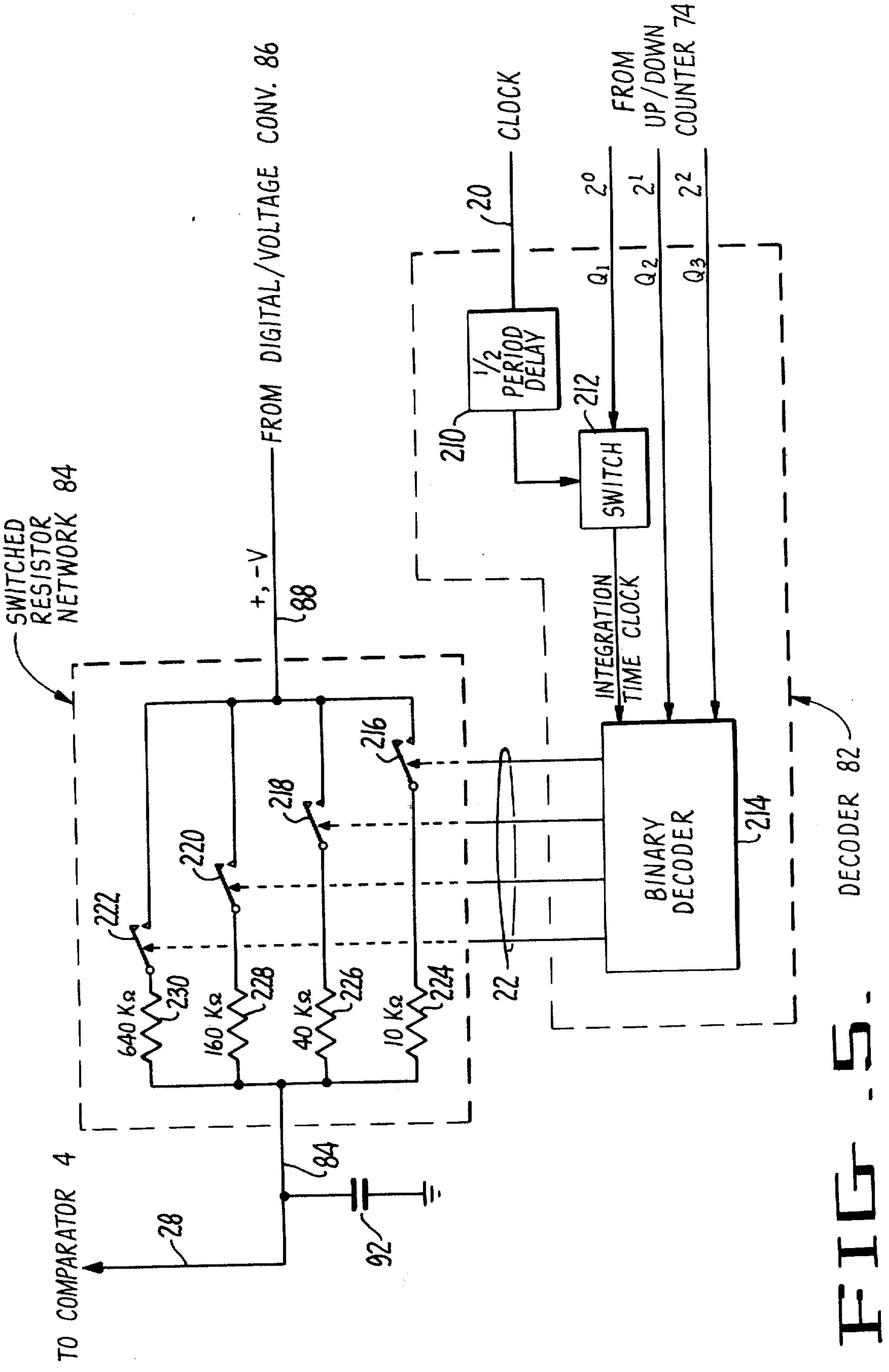
FIG. 5 is a partial block schematic diagram of the step size number decoder and switched resistor network.

FIG. 5 shows the decoder 82 and switched resistor network 84 in greater detail. The decoder 82 includes a one-half period delay unit 210, a switch 212 and a conventional binary decoder 214. Lines $Q_2$ and $Q_3$ from the counter 74 are applied directly to the binary decoder. Line $Q_1$ is applied to switch 212. The half period delay 210 and switch 212 are employed in order to provide a saving in the number of resistors required in the network 84. By delaying the sampling clock line 20 by half a period the integration time may be vaired between an entire data interval and only a half data interval thus effectively doubling the number of resistance values available by changing the integration time of the RC combination. The control lines from the binary decoder 214 control a plurality of switches 216, 218, 220 and 222 in series with resistors 224, 226, 228 and 230, respectively. For the purposes of example only, resistance values of the desired ratio are shown assigned to each of the resistors, namely, 10K ohms, 40K ohms, 160K ohms and 640K ohms. Thus, by controlling the switches and the integration time over a half or whole period a dynamic range of 128 to 1 in the quantization step size is possible. If desired, the integration time feature can be omitted and instead the decoder 82 can have an eight line output for controlling eight resistors and eight switches.

It will also be apparent to those of ordinary skill in the art that a greater or lesser number of step sizes can be used by properly modifying the capacity of counter 74, decoder 82 and network 84.

In accordance with the arrangement of FIG. 1, the detailed elements of FIGS. 2–5 are employed in the receiver portion of the overall adaptive delta modulation system of this invention.

The present invention thus provides an improved adaptive delta modulation system which has no tendency to creating noise bursts yet which provides a wide dynamic range of step sizes while providing optimum step size ratio. Nevertheless, the system is implemented using straightforward, easily implemented logic and components.

Other modifications of the preferred embodiment within the scope of the teachings herein may be apparent to those of ordinary skill in the art. The invention is therefore to be limited only by the scope of the appended claims.

I claim:

1. In a delta-modulation system in which digital signals having two senses are employed in a first serial bit stream having a data interval between bits defined by a periodic clock signal to represent an increase or decrease of an analog signal by a predetermined amount, the combination comprising:

means responsive to said first serial bit stream for providing a second serial bit stream delayed one data interval therefrom and for providing a third serial bit stream delayed two data intervals therefrom, and means receiving said first, second and third serial bit streams for providing an up count signal on a first output line when the digital signals of said first, second and third serial bit streams are equal in each of the two senses and a down count signal on a second output line when the digital signals of said first and third serial bit streams are equal to each other and not equal to the digital signal of said second serial bit stream in each of the two senses.

2. The combination of claim 1 further comprising up/down counter means responsive to said up count signal on said first output line, said down count signal on said second output line and said periodic clock signal for counting up upon receipt of an up count signal and a periodic clock signal and for counting down upon receipt of a down count signal and a periodic clock signal to provide an output representing the count in said counter means.

3. The combination of claim 2 wherein said counter means in inhibited from counting in response to an inhibit signal and the combination further comprises means for providing an inhibit signal to said counter means in alternating data intervals when an up count or down count signal is applied to said counter means in successive data intervals.

4. The combination of claim 3 further comprising decoder means receiving the count in said up/down counter means for providing a plurality of control signals in response thereto, and integrator means receiving said plurality of control signals and said first serial bit stream for integrating a magnitude responsive to said control signals in a first direction upon receipt of a first digital signal and for integrating a magnitude responsive to said control signals in a second direction upon receipt of a second digital signal.

5. The combination of claim 4 wherein said control signals include a signal for controlling the integration time of said integrator means during a data interval.

6. In a delta-modulation system in which first and second digital signals are employed in a first serial bit stream having a data interval between bits defined by a periodic clock signal to represent an increase or decrease of an analog signal by a predetermined amount, the combination comprising:

means responsive to said first serial bit stream for providing a second serial bit stream delayed one data interval therefrom and for providing a third serial bit stream delayed two data intervals therefrom, means receiving said first, second and third serial bit streams for providing an up count signal when the digital signals of said first, second and third serial bit streams are equal and a down count signal when the digital signals of said first and third serial bit streams are equal to each other and not equal to the digital signal of said second serial bit stream, up/down counter means responsive to said up count signal, said down count signal and said periodic clock signal for counting up upon receipt of an up count signal and a periodic clock signal and for counting down upon receipt of a down count signal and a periodic clock signal to provide an output representing the count in said counter means, said counter means being inhibited from counting in response to an inhibit signal, and means for providing an inhibit signal to said counter means in alternating data intervals when an up count or down count signal is applied to said counter means in successive data intervals.

7. The combination of claim 6 further comprising decoder means receiving the count in said up/down counter means for providing a plurality of control signals in response thereto, and integrator means receiving said plurality of control signals and said first serial bit stream for integrating a magnitude responsive to said control signals in a first direction upon receipt of a first digital signal and for integrating a magnitude responsive to said control signals in a second direction upon receipt of a second digital signal.

8. The combination of claim 7 wherein said control signals include a signal for controlling the integration time of said integrator means during a data interval.

* * * * *

UNITED STATES PATENT OFFICE

CERTIFICATE OF CORRECTION

Patent No. 3,922,606 Dated November 25, 1975

Inventor(s) K. FREDRIK NORDLING

It is certified that error appears in the above-identified patent and that said Letters Patent are hereby corrected as shown below:

Column 4, line 29, "set "1" should be -- set to "1" --.

line 33, "Q*" should be -- $\bar{Q}$*.

Column 5, line 11, "$Q^{=}$" should be --Q* --;

line 45, "cound" should be -- count --.

Column 6, line 59, "in" (first occurrence) should be -- is --.

Signed and Sealed this sixth Day of April 1976

[SEAL]

Attest:

RUTH C. MASON
*Attesting Officer*

C. MARSHALL DANN
*Commissioner of Patents and Trademarks*